United States Patent [19]
Liu

[11] Patent Number: 4,772,101
[45] Date of Patent: Sep. 20, 1988

[54] REMOTELY CONTROLLABLE REAL-TIME OPTICAL PROCESSOR

[75] Inventor: Hua-Kuang Liu, South Pasadena, Calif.

[73] Assignee: The United States of America as represented by the Administrator of the National Aeronautics and Space Administration, Washington, D.C.

[21] Appl. No.: 927,972

[22] Filed: Nov. 7, 1986

[51] Int. Cl.[4] .......................... G02F 1/13; G02B 27/46
[52] U.S. Cl. ................................ 350/337; 350/331 R; 350/342; 350/162.13; 382/31
[58] Field of Search ................... 350/331 R, 336, 342, 350/162.13, 174, 333, 347 E, 345; 356/71; 358/236, 240, 250; 382/31, 42

[56] References Cited

U.S. PATENT DOCUMENTS

| | | | |
|---|---|---|---|
| 3,655,269 | 4/1972 | Heilmeier | 350/160 |
| 3,676,591 | 7/1972 | Nix, Jr. et al. | 178/7.5 D |
| 3,744,879 | 7/1973 | Beard et al. | 350/162 SF |
| 3,764,211 | 10/1973 | Morse et al. | 355/71 |
| 3,798,452 | 3/1974 | Spitz et al. | 250/213 R |
| 3,824,002 | 7/1974 | Beard | 350/342 |
| 4,018,509 | 4/1977 | Boswell et al. | 350/342 |
| 4,124,278 | 11/1978 | Grinberg et al. | 350/342 |
| 4,202,608 | 5/1980 | Kaufmann | 350/339 R |
| 4,345,248 | 8/1982 | Togashi et al. | 340/784 |
| 4,533,215 | 8/1985 | Trias et al. | 350/347 E |
| 4,556,986 | 12/1985 | Craig | 350/335 |
| 4,695,973 | 9/1987 | Yu | 350/162.13 |
| 4,715,683 | 12/1987 | Gregory et al. | 350/162.13 |

FOREIGN PATENT DOCUMENTS

| | | | |
|---|---|---|---|
| 2118347 | 10/1983 | United Kingdom . | |
| 2154331 | 9/1985 | United Kingdom | 350/350 S |

OTHER PUBLICATIONS

J. Hetch-"Light Modulators Help Crunch Image Data", pp. 69-72-High Technology-Jan. 1985.
Y. Tori-"Printed Chinese Character-Optical Correlator", pp.51-56-Optics Communications-vol. 24, No 1-Jan. 1978.
D. Casasent-"Pattern Recognition: A Review", pp. 28-33-IEEE Spectrum-Mar. 1981.
Y. Tori-"An Optical Pattern . . . of Liquid Crystal", pp. 1121-1132-Review of Elect. Communication Lab., vol. 23, Nos. 9, 10-1975.

*Primary Examiner*—Stanley D. Miller
*Assistant Examiner*—Tai Van Duong
*Attorney, Agent, or Firm*—Paul F. McCaul; Thomas H. Jones; John R. Manning

[57] ABSTRACT

An optical processor is provided which facilitates selection of any of a variety of patterns or images which are to be compared with a Fourier transform of a template image, wherein the processor can be constructed at low cost. One of the two images that are to be compared is formed by generating video signals representing the image and using those signals to drive a liquid crystal array through which light passes.

5 Claims, 1 Drawing Sheet

FIG. 1
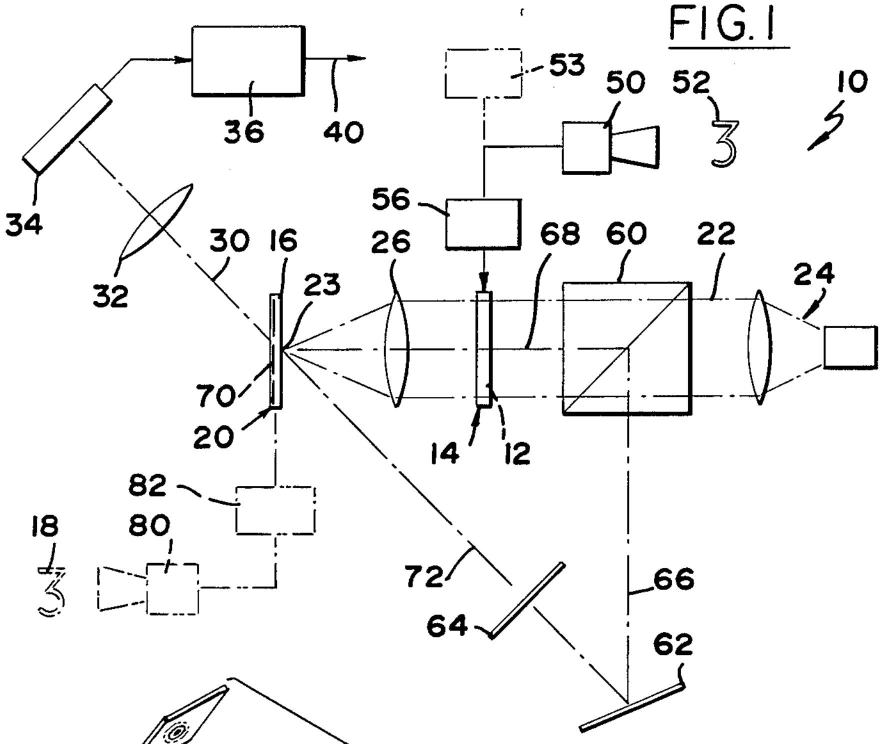
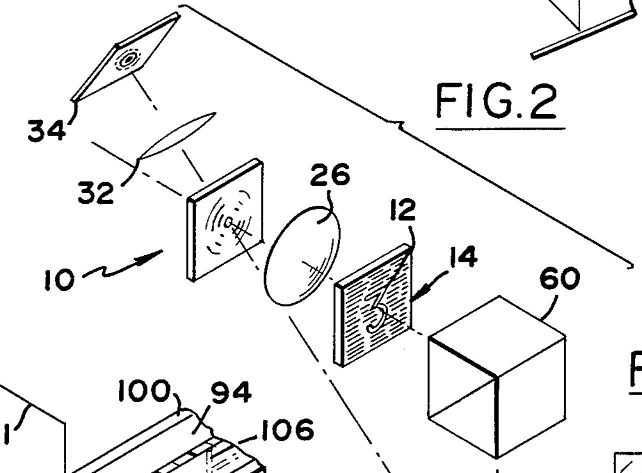
FIG. 2
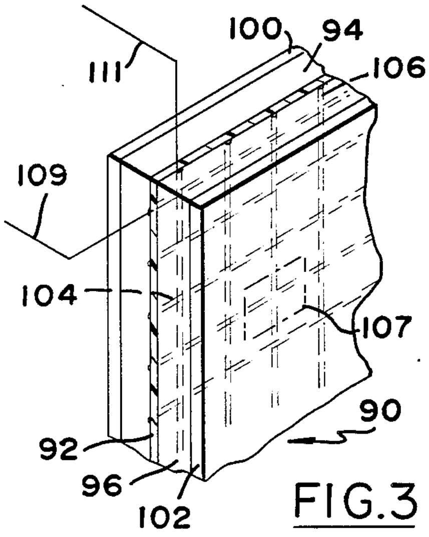
FIG. 3
FIG. 4
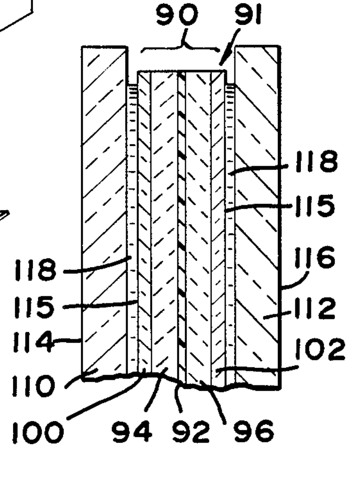

REMOTELY CONTROLLABLE REAL-TIME OPTICAL PROCESSOR

ORIGIN OF INVENTION

The invention described herein was made in the performance of work under a NASA contract, and is subject to the provisions of Public Law 96-517 (35 USC 202) in which the Contractor has elected not to retain title.

BACKGROUND OF THE INVENTION

An optical processor, such as a two-dimensional spacial light modulator, can compare an input pattern with a Fourier transform of a template pattern to determine their degree of correspondence. Most prior art optical processors involve the comparison of a pattern formed on a photographic film optical transparency with the Fourier transform of a template pattern which is formed on another photographic film. This has the disadvantage that a transparency photograph has to be produced and developed each time an input image is to be compared to the template image. One variation of this, described in U.S. Pat. No. 4,018,509 by Boswell, is to focus an image of a transparency onto an array of photoconductors and liquid crystal pixels, to control the reflectivity of the liquid crystal array. In addition to requiring a transparency, the system is expensive, in that it is expensive to construct a combined array of photoconductors and liquid crystal pixels. One system suggested by Hughes Aircraft Co. uses charge coupled devices controllable by video signals, to control the reflectivity of crystal liquid devices. The production of the array of charge couple devices used in such a system is very expensive. An optical processor which could construct an input pattern for comparison with the Fourier transform of a template pattern, which enabled the rapid and inexpensive creation of input patterns in an input device of low cost, would be of considerable value.

SUMMARY OF THE INVENTION

In accordance with one embodiment of the present invention, an optical processor is provided for comparing an input pattern or image with the Fourier transform of a template pattern or image to determine their degree of correlation, which enables the creation of one or both images rapidly and at low cost. One of the image-creating devices such as the input device, comprises a liquid crystal array wherein each pixel is individually addressable. A means for generating video signals representing images is connected to the array to energize the pixels in a pattern of transparencies representing the desired image.

A low-cost available liquid crystal array, such as from a miniature television set which uses such an array, can be used. To avoid distortions, a pair of outer plates can be placed at opposite faces of the available liquid crystal array, and the space between each plate and the array can be filled with a liquid or epoxy of an index of refraction similar to the polarizers at opposite faces of the array. The plates have outer surfaces which are precision ground flat, to avoid distortions that would seriously degrade the optical correlation process.

The novel features of the invention are set forth with particularity in the appended claims. The invention will be best understood from the following description when read in conjunction with the accompanying drawings.

BRIEF DESCRIPTION OF THE DRAWINGS:

FIG. 1 is a simplified side elevation view of an optical processor constructed in accordance with one embodiment of the present invention.

FIG. 2 is a partial perspective view of the processor of FIG. 1.

FIG. 3 is a perspective view of the input device of the system of FIG. 1.

FIG. 4 is a sectional view of the input device of FIG. 3.

DESCRIPTION OF THE PREFERRED EMBODIMENTS:

FIGS. 1 and 2 illustrate an optical processor 10 of the present invention, which can compare an input image or pattern 12 formed by an input device 14 with the spacial Fourier transform image or pattern 16 of a template pattern 18 formed by a holographic matched filter device 20. The patterns 12, 16 are represented by the relative transparencies or opaquenesses of areas of the devices 14, 20. The correlation is accomplished by directing collimated, coherent light 22 from a laser source 24, so at least part of the light 22 passes through the input device 14, and through a Fourier transform lens 26 (which forms the Fourier transform of the pattern 12 at a location 23) onto the matched filter device 20. If there is very little correlation between the image 12 represented by the input device 14 and the Fourier transform image 16 represented by the matched filter device 20 (i.e., the image 12 and the template image 18 on which the Fourier transform image 16 is based, are dissimilar), then very little light will be diffracted at an angle along a path 30. However, if there is a fair degree of correlation, a considerable portion of the light 22 will be diffracted at the matched filter device 20 along the path 30 and will be concentrated by a lens 32 onto a photodetector 34. The amount of light falling on the photodetector 34 indicates the degree of correlation. In practice, the photodetector 34 may be a camera with an input to a decision processing circuit 36 which has an output 40 indicating not only the degree of correlation, but also the X, Y coordinates of the location of the correlated image. This basic type of system is known in the prior art.

The most common type of prior art correlator has used an input device 14 that was a photographic transparency. The correlation of an input image with a template image required considerable time to make and mount the transparency. In accordance with the present invention, the input device 14 is a liquid crystal array, of the type which has multiple rows and columns of pixels that can be individually addressed to control their transparency. This permits the creation of input patterns by using video signals to control the multiple pixels. Such video signals can be rapidly created by a video camera 50, at a distant location or at the same location as the rest of the correlator, which views a pattern 52 such as that of an object on a background to create video signals representing the observed pattern. An alternative is to use a computer 53 to generate video signals representing patterns, which are instantly created by the input device 14. In one example, the system is used to detect the presence of a certain type of object in a landscape background. The camera 50 can scan the landscape, creating a new input pattern 12 many times each second.

An available liquid crystal array for the input device 14 is part of a miniature or "pocket TV" television set. One example is the Radio Shack LCTV Realistic Pocketvision, catalog No. 16-151, which contains 146 rows and 120 columns of liquid crystal pixels, each being a square which is 370 um on each side. This miniature television set also includes a video drive circuit, indicated at 56, which can be driven not only by a broadcast receiver, but which can be adapted to be driven by the output of a video camera 50. Applicant has successfully used the LCD (liquid crystal display) of this television set to produce a pattern viewed by a camera in an optical processor of the type shown in FIG. 1.

The use of a liquid crystal array to quickly and easily establish a desired input pattern 12, also facilitates the production of a matched filter device 20 containing a desired pattern 16. To permit this, the system of FIG. 1 includes a beam splitter 60, reflector 62, and shutter 64. To create a filter device 20 representing the pattern of an object 52, applicant opens the shutter 64. Light from the laser 24 is split by the beam splitter 60 into a reference beam 66 and an object beam 68. The object beam 68 passes through the input device 14 which at that time contains the template image (to which future images will be compared). The object beam then passes through lens 26 and through a photographic film indicated at 70, which initially includes an unexposed photosensitive emulsion. The film 70 is at the position which will later be occupied by the matched filter device 20. The reference beam 66 from the beam splitter is reflected off the reflector 62 and passes through the open shutter 64 to move along a path 72 which is aligned with the path 30. The interference of the two beams, one of which has passed through the input device 14 which contains the desired template image, results in the creation of a Fourier transform of the template image onto the film 70. The film 70 is developed, and can then be used as the matched filter 20 for comparing an input image with the new template image.

While the matched filter device 20 can be a simple photographic transparency, it is also possible to use a liquid crystal array instead. Such a liquid crystal array, which can be formed by the display of an LCD television set, can receive its input from a camera 80 which views the desired template pattern 18. The output of the camera 80 is passed through a Fourier transform circuit 82 before it is used to drive the liquid crystal array. It may be noted that the matched filter is a Fourier transform of the template image where the light 68 passing through the input image 12 is collimated, and is a modified Fourier transform image if the light is not collimated.

FIGS. 3 and 4 illustrate a portion of a liquid crystal array 90 which can be used in a system of the present invention. Such a prior art array 90 includes a stack 91 of layers including a layer 92 of liquid crystal material sandwiched between a pair of glass plates 94, 96. The glass plates may, in turn, be sandwiched between a pair of polarizer sheets 100, 102. The glass plates bear conductor 104, 106 that extend in perpendicular directions. The conductors are substantially opaque and form a grid pattern superimposed on the pattern formed by the pixels. A matched filter 20 may be formed by exposing a photographic film 70 using the device 14, as described above. In that case, the matched filter will represent a pattern which includes a Fourier transform of the grid. The Fourier transform of the grid comprises largely opaque dot regions, and is superimposed on the Fourier transform of the desired template image viewed by the TV camera or created by the computer.

When no voltage is applied across the conductors 104, 106, a pixel area or pixel 107 at the intersection of a pair of conductors is opaque, while as the voltage difference (as between wires 109, 111) increases the transparency of the pixel increases. In actuality, the voltage rotates the polarization of light passing therethrough, so that progressively more of it is passed by the exit polarization sheet.

Applicant has found that an LCD (liquid crystal display) 90 for the above-mentioned television set has outer surfaces that are not precisely flat, the deviation being about six wavelengths for the particular array used by applicant. This results in refraction of light rays passing through the LCD, which interferes with the correlation of the images. To obtain better correlation, applicant places the stack of layers of LCD 90 between a pair of transparent containment plates 110, 112 which have precision flat outer surfaces 114, 116 on their faces that are opposite the LCD 90. The containment plates therefore lie facewise adjacent to opposite ends 115 of the LCD stack 91. Also, an intermediate liquid material 118, which has an index of refraction that fairly closely matches the indexes of refraction of the materials of the sheets 100, 102 of the array, is flowed into place to lie between the plates and the opposite sides of the array. Mineral oil has been found to fairly closely match the index of refraction of the array of the above LCD of the above-mentioned television set. Applicant has found that the resulting input device avoids distortion that would seriously affect correlation of the input pattern with the Fourier transform of the template pattern. It is possible to allow a material such as an epoxy which has flowed into place, to harden. As long as the material is a flowed material, so it has filled the space between the LCD stack and the plates, distortion can be avoided.

Thus, the invention provides an optical processor with an input device that enables the rapid, in fact real time, creation of input patterns for correlation with a template pattern. This is accomplished by using a video-driven liquid crystal array. The liquid crystal array is available at very low cost by using the LCD and video drive circuit of a LCD television set. Although the faces of the television LCD are not flat, as is required for good performance in an optical processor, this can be overcome by placing the LCD between transparent plates whose outer faces are flat, and by filling the space between the plates and the LCD with a liquid whose index of refraction largely matches that of the LCD.

Although particular embodiments of the invention have been described and illustrated herein, it is recognized that modifications and variations may readily occur to those skilled in the art, and consequently, it is intended that the claims be interpreted to cover such modifications and equilavents.

What is claimed is:

1. In an optical processor which includes means for directing coherent light through an imput pattern formed by an imput device that includes a liquid crystal array containing multiple pixels whose transparancies can be controlled and a means for controlling the pixels to form the input pattern, means for forming a substantially Fourier transform image of the input pattern onto a matched filter device, and means for sensing the degree of correlation of the input pattern with the template pattern on which the matched filter device is based, the improvement wherein:

said liquid crystal array includes a stack of original layers which has opposite stack ends and which can form an image, said array also including a layer of liquid crystal material and a pair of sheets of substantially transparent material on opposite sides of said layer of liquid crystal material at opposite ends of said stack; and a pair of outer plates lying facewise adjacent to opposite ends of said stack, and a quantity of flowed material lying between each end of the stack and the corresponding outer plate, each outer plate having a precision flat face lying furthest from the stack, and said flowed material having about the same index of refraction as the material of said layers which lie at opposite ends of said stack.

2. An optical processor comprising:

an input device which produces a pattern comprising relatively transparent and opaque areas;

a filter device representing substantially the Fourier transform of an image; and means for detecting the degree of correlation of the pattern of said input device and the image represented by said filter device, including means for directing coherent light at said imput device to engage said pattern, and for directing light which has engaged said pattern onto said filter device;

said input device including an addressable liquid crystal array comprising a multiplicity of pixels, and means for generating video signals connected to said array to address said pixels to control their transparency;

said liquid crystal array includes a stack of original layers which has opposite stack ends and which can form an observable image, said stack including a pair of sheets of substantially transparent material at opposite ends of said stack;

said array also including a pair of outer plates lying facewise adjacent to opposite ends of said stack, and a quantity of substantially liquid material lying between each end of the stack and the corresponding outer plate, each outer plate having a precision flat face lying furthest from the stack, and said flowed material having about the same index of refraction as the material of said layers which lie at opposite ends of said stack.

3. In a method for determining the correlation between first and second images by forming a first transparency having a pattern representing substantially the Fourier image transform of a first of the images, forming a second transparency having a pattern representing the second image, and passing coherent light through said transparencies and detecting the correlation of said beams, wherein one of said transparencies is formed by generating video signals representing one of said patterns and energizing a liquid crystal array with said video signals to control the transparency of the pixols of the array to produce the pattern of said one of said transparencies, the improvement wherein:

said step of forming one of said transparencies includes placing a stack of layers which includes a layer of liquid crystal material that is sandwiched between sheets of transparent material, between a pair of transparent plates that each has a precision flat surface on a face thereof furthest from the stack, and maintaining an intermediate flowed material of about the same index of refraction as said sheets between the ends of the stack and said plates.

4. In an optical processor which includes means for directing coherent light through an input pattern formed by an input device, means for forming a substantially Fourier transform image of the input pattern onto a matched filter device, and means for sensing the degree of correlation of the input pattern with the template pattern on which the matched filter device is based, the improvement wherein:

said input device comprises a liquid crystal array that includes a grid formed of a multiplicity of largely opaque row and column electrical conductors and means for generating video signals as input informations, coupled to said electrical conductors; and said template pattern is the image of an object, and said matched filter device is the Fourier transform of the image of said object superimposed on the Fourier transform of said grid which are largely opaque regions.

5. In a method for determining the correlation between first and second images by forming a first transparency having a pattern representing substantially the Fourier image transform of a first of the images, forming a second transparency having a pattern representing the second image, passing coherent light through said transparencies and detecting the correlation of said beams, the improvement wherein:

said step of forming said second transparency includes generating video signals as input informations of one of said patterns, and energizing a liquid crystal array with said video signals to control the transparency of the pixels of the array to produce the pattern of said second transparency, wherein the array includes a grid of opaque conductor lines;

said step of forming said first transparency includes dividing coherent collimated light into reference and active beams, directing the active beam through said array while energizing said array to form said first image, and onto a photographic emulsion, and directing the reference beam at said emulsion, to produce a Fourier transform of said first image superimposed on the Fourier transform of said grid lines of said array

* * * * *